(12) United States Patent
Al-Mehthel et al.

(10) Patent No.: US 8,662,111 B2
(45) Date of Patent: Mar. 4, 2014

(54) ECONOMICAL HEAVY CONCRETE WEIGHT COATING FOR SUBMARINE PIPELINES

(75) Inventors: Mohammed Al-Mehthel, Dhahran (SA); Mohammed Maslehuddin, Dhahran (SA); Bakr Hammad, Al-Khobar (SA); Alaeddin A. Al-Sharif, Dhahran (SA); Mohammed Ibrahim, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 954 days.

(21) Appl. No.: 12/786,336

(22) Filed: May 24, 2010

(65) Prior Publication Data

US 2011/0283516 A1    Nov. 24, 2011

(51) Int. Cl.
*F16L 9/14* (2006.01)
*E01B 3/28* (2006.01)

(52) U.S. Cl.
USPC ........... 138/145; 138/146; 138/172; 138/141; 405/171; 106/714

(58) Field of Classification Search
USPC ......... 138/172, 178, 103, 145, 146, 137, 140; 405/171, 172; 106/707, 789, 790
See application file for complete search history.

(56) References Cited

U.S. PATENT DOCUMENTS

| | | | |
|---|---|---|---|
| 2,458,039 A * | 1/1949 | Wait | 106/457 |
| 3,240,512 A * | 3/1966 | Pennington et al. | 285/45 |
| 3,454,051 A | 7/1969 | Goepfert | |
| 3,740,958 A * | 6/1973 | Cadwell | 405/166 |
| 3,742,985 A * | 7/1973 | Rubenstein | 138/141 |
| 4,052,862 A * | 10/1977 | Lamy | 405/171 |
| 4,142,555 A * | 3/1979 | Satake et al. | 138/143 |
| 4,198,450 A | 4/1980 | Hooykaas | |
| 4,395,159 A * | 7/1983 | Karuks et al. | 405/172 |
| 4,606,378 A | 8/1986 | Meyer | |
| 5,393,342 A | 2/1995 | Hooykaas | |
| 6,491,751 B1 | 12/2002 | Watson | |
| 6,663,453 B2 | 12/2003 | Quigley | |
| 7,141,112 B2 * | 11/2006 | Comrie | 106/697 |
| 8,221,541 B2 * | 7/2012 | Koh et al. | 106/714 |
| 2005/0160946 A1 * | 7/2005 | Comrie | 106/790 |
| 2006/0272551 A1 * | 12/2006 | Comrie | 106/705 |

FOREIGN PATENT DOCUMENTS

| | | |
|---|---|---|
| CA | 1037395 | 8/1978 |
| NL | 7403055 | 9/1975 |

OTHER PUBLICATIONS

International Search Report issued in PCT/US2011/037145 mailed on Aug. 31, 2011.

* cited by examiner

*Primary Examiner* — Patrick F Brinson
(74) *Attorney, Agent, or Firm* — Bracewell & Giuliani LLP (57) ABSTRACT

Economical heavy concrete weight coating is used as a weight coating for submarine pipes. The developed economical heavy concrete weight includes steel slag and iron ore as aggregate. Steel slag can contain iron and thus have a higher density than some other types of slag. By supplementing the steel slag with iron ore as aggregate, the economical heavy concrete weight coating can have a higher density than a coating having just slag. Economical heavy concrete weight coating can have a density greater than 190 pcf.

16 Claims, 5 Drawing Sheets

ECONOMICAL HEAVY CONCRETE WEIGHT COATING FOR SUBMARINE PIPELINES

BACKGROUND OF THE INVENTION

1. Technical Field of the Invention

This invention generally relates to the field of submarine pipelines. In particular, the present invention is directed to an economical heavy concrete weight coating used to keep the submarine pipeline submerged below the surface of the water.

2. Description of the Related Art

Concrete coating is applied on submerged offshore pipelines to provide additional mass to ensure sufficient negative buoyancy. The minimum weight of the coating for this purpose is around 190 pounds per cubic foot ("pcf"). Portland cement with natural aggregates is an inexpensive material that can weight concrete, but it does not meet the 190 pcf criterion. Therefore, heavyweight aggregates, such as iron ore, are used in lieu of natural aggregates. The proportion of iron ore aggregates may be 75% of the total weight of the concrete coating. Consequently, the cost of the coating is high. It is desirable to have a concrete coating that achieves 190 pcf that is less expensive.

Various types of slag are produced during the production of iron and steel. Iron is produced by combining scrap iron or iron ore with a fluxing agent, such as limestone or dolomite, with a fuel, such as coke, in a blast furnace. The result is iron and blast furnace slag. The iron is frequently used as feedstock for a basic oxygen or electric arc furnace to produce steel.

Blast furnace slag is a byproduct of iron production. It is generally non-metallic and includes silicates, aluminosilicates, and calcium-aluminino silicates. The blast furnace slag is often used in concrete or asphalt. The most desirable, and thus common, use of blast furnace slag is in the form of ground granulated blast furnace slag ("GGBFS"). The GGBFS is created by rapidly water-quenching the molten slag to cool and solidify it. The rapid quenching produces a granulated slag that includes sand-sized fragments with little or no crystallization. The granulated slag can be ground (crushed or milled) to very fine cement-sized particles. Hence the name "ground granulated blast furnace slag." GGBFS has cement-like binding properties, which make it a suitable replacement for or additive to Portland cement.

Air-cooled blast furnace slag is blast furnace slag that is poured into beds or molds and slowly cooled under ambient conditions. During the slow-cooling process, the blast furnace slag forms a crystalline structure. The result is a hardened crystalline slag that can be subsequently crushed or molded. Pelletized blast furnace slag is a variation of air-cooled blast furnace slag. It is formed by cooling and solidifying the blast furnace slag with water and then air quenching it in a spinning drum. The result is pelletized blast furnace slag having a crystalline structure. Air cooled blast furnace slag and pelletized blast furnace slag are sometimes used as a lightweight aggregates in concrete or asphalt. Aggregate is a hard, inert material (such as sand, gravel or slag) that is bound with a cementing material to form concrete.

Steel is made by heating iron in a basic oxygen furnace or electric arc furnace. Oxygen is injected into molten iron in the furnace. The oxygen reacts with impurities such as carbon monoxide, silicon, manganese, and phosphorus to form liquid oxides. The oxygen also reacts with some iron. The liquid oxides combine with lime and dolomite to form steel slag. This steel slag is different than blast furnace slag. Indeed, steel slag does not possess any cementing property as does GGBFS in crushed form.

Steel slag is disposed of as waste, or sometimes used in road construction as aggregate in the granular base (the roadbed below the driving surface), embankments, engineered fill, highway shoulders, and hot mix asphalt pavement.

SUMMARY OF THE INVENTION

Submarine pipes are used for a variety of applications, such as subsea gas pipelines, subsea oil pipelines, and submarine pipes going to loading and unloading terminals for ocean-going tankers. The pipelines can be weighted to ensure that they do not float to the surface where a ship could strike them. Furthermore, weights are necessary to hold the pipes in place and thus prevent stress on the pipe and pipe joints.

Economical heavy concrete may used to weight subsea pipes. The economical heavy concrete weight coating includes cement, iron ore, steel slag, and sand. Water can be used to activate the cement so that it binds the other components together. Subsea pipes are coated with the economical heavy concrete weight coating before the pipes are placed in the sea/ocean bed. The economical heavy concrete weight coating is attached to the pipe by, for example spraying, pouring, or compressing it onto the pipe.

Conventional concrete, which uses natural aggregate such as gravel and sand, does not have sufficient density to weight the subsea pipelines. Conventional concrete coating can use iron ore as an aggregate to weight the pipe. The iron ore is relatively expensive and is not readily available in some parts of the world.

Economical heavy concrete weight coating achieves the desired density by using a combination of steel slag and iron ore as aggregate. Steel slag does not have cementious binding properties.

A device for weighting subsea pipes can include one or more pipe segments where each of the pipe segments has an exterior surface and a first connector at a first end and a second connector at a second end, each of the first and second connectors positioned to connect each of the pipe segments to an adjacent one of the pipe segments. The device can also include an economical heavy concrete weight coating attached to the exterior surface of the pipe segments, the economical heavy concrete weight coating having a unit weight greater than about 190 pounds per cubic foot, and a compressive strength able to withstand 50 Newtons per square millimeter. The economical heavy concrete weight coating can include a cementious compound that includes calcium compounds, silica, alumina, iron oxide, and gypsum; steel slag aggregate that includes 30-35% iron oxide, 5-10% aluminum oxide, 20-25% calcium oxide, and 7-10% magnesium oxide, with a specific gravity greater than 3.2, water absorption less than 3%; iron ore aggregate; and sand. The economical heavy concrete weight coating can extend axially along the exterior surface of each pipe segment and have a radial thickness in a range of 1-5 inches.

In one embodiment, the economical heavy concrete weight coating is attached to the exterior surface by first forming a ribbon of economical heavy concrete weight coating and then compressing the ribbon of economical heavy concrete weight coating onto the length of pipeline as the length of pipeline is rotated about its axis. In one embodiment, the economical heavy concrete weight coating is attached to the length of pipeline by pouring the economical heavy concrete weight coating into a mold and having the length of pipeline located in the mold. In one embodiment, the economical heavy concrete weight coating is attached to the length of pipeline by spraying the economical heavy concrete weight coating onto the length of pipeline.

In one embodiment, the iron ore comprises 40-45% of the total weight of the economical heavy concrete weight coating. In one embodiment, the cementious compound makes up no more than 17% of the total weight of the economical heavy concrete weight coating. In one embodiment, the cementious compound makes up at least 15% of the total weight of the economical heavy concrete weight coating. In one embodiment, the economical heavy concrete weight coating includes, by weight, 30-35% steel slag.

In one embodiment, a substantial portion of the steel slag aggregate includes individual pieces of steel slag, wherein each of the individual pieces of steel slag have a width of 2.38 mm to 4.76 mm. In one embodiment, the economical heavy concrete weight coating includes, by weight, 2-3% sand. In one embodiment, the economical heavy concrete weight coating includes, by weight, 5-6% water, at the time the economical heavy concrete weight coating is mixed.

In an embodiment of a technique for increasing the negative buoyancy of pipe, the technique includes creating an economical heavy concrete weight coating that includes Portland cement; iron ore, the iron ore being less than one half of the weight of the economical heavy concrete weight coating; steel slag, the steel slag produced by purifying steel billets in an electric arc furnace or a basic oxygen furnace; and sand to give the economical heavy concrete weight coating a unit weight of at least about 190 pounds per cubic foot and a thickness in a range of 1-5 inches. The technique also includes the steps of attaching the economical heavy concrete weight coating to an outer surface of one or more segments of pipe; connecting each of the segments of pipe to an adjacent segment of pipe to create a length of subsea pipeline; submerging the length of subsea pipeline in a body of water. The subsea pipeline has a negative buoyancy that maintains the length of subsea pipeline below a surface of the body of water.

In one embodiment, the steel slag makes up 40-45 percent of the economical heavy concrete weight coating. In one embodiment, the step of attaching the economical heavy concrete weight coating to the outer surface of each of the segments of pipe includes compressing the economical heavy concrete weight coating onto the outer surface. In one embodiment, the step of attaching the economical heavy concrete weight coating to the outer surface of each of the segments of pipe includes spraying the economical heavy concrete weight coating onto the outer surface.

In one embodiment of an apparatus for weighting subsea pipelines, the apparatus includes an economical heavy concrete weight coating that includes 40 to 45% iron ore; 16-17% cement; 2-3% sand; and 30 to 35% steel slag. The steel slag includes 30-35% iron oxide; 5-10% aluminum oxide; 20-25% calcium oxide; 7-10% magnesium oxide. The apparatus also includes a segment of pipeline, wherein the economical heavy concrete weight coating covers a substantial portion of an exterior surface of the segment of pipeline.

In one embodiment, the steel slag does not have cementious binding properties. In one embodiment, the radial thickness of the economical heavy concrete weight coating is less then five inches. In one embodiment, the unit weight of the economical heavy concrete weight coating is at least 190 pcf. In one embodiment, the unit weight of the economical heavy concrete weight coating is less than 210 pcf.

DETAILED DESCRIPTION OF THE INVENTION

The present invention will now be described more fully hereinafter with reference to the accompanying drawing which illustrates embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
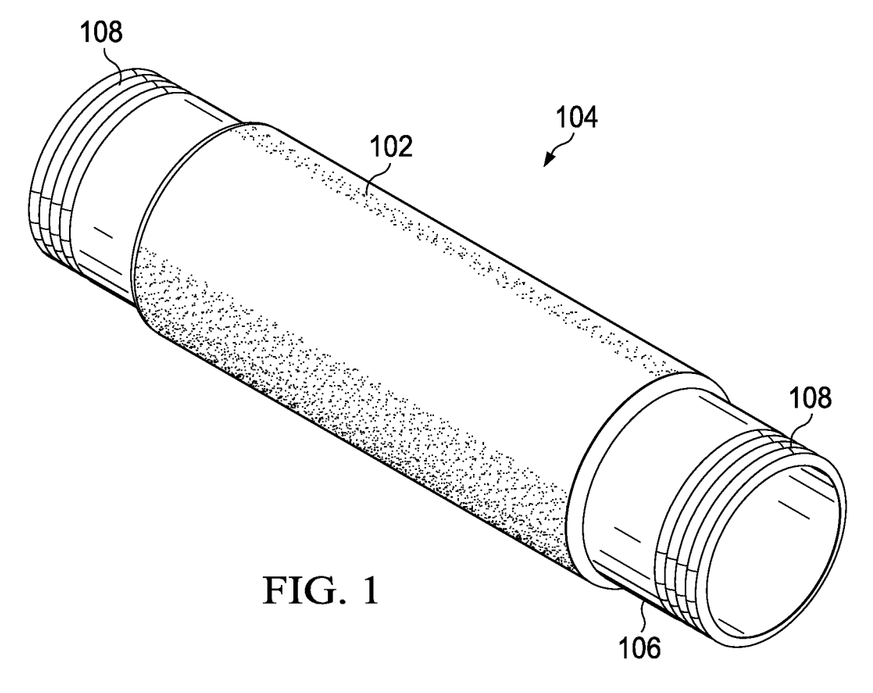
FIG. 1 is an orthogonal view of an exemplary embodiment of economical heavy concrete weight coating attached to a subsea pipe.

Referring to FIG. 1, submerged offshore pipelines can have natural buoyancy that either causes the pipe to float towards the surface or creates stress on pipe joints and connections. The buoyancy problem can be controlled by applying weights to the pipe to ensure the pipe has sufficient negative buoyancy. One type of weight is an economical heavy concrete weight coating. A heavyweight pipe assembly 100 is created by applying an economical heavy concrete weight coating 102 to a length of subsea pipe 104. Subsea pipe 104, also referred to as submarine pipe, can be any type of pipe intended to be used while submerged in a body of water. The type of water includes sea water or fresh water. The economical heavy concrete weight coating 102 adheres or is otherwise attached to an exterior surface 106 of the length of pipe 104. Preferably, the economical heavy concrete weight coating 102 extends circumferentially around exterior surface 106 and extends axially to cover a substantial length of pipe segment 104. Connectors 108, which can be threads or exposed surfaces suitable for welding (not shown) can be located at the ends of pipe segment 104. Preferably, the economical heavy concrete weight coating 102 does not cover connectors 108. The high density of the economical heavy concrete weight can provide enough negative buoyancy to reduce or eliminate the pipeline's tendency to float towards the surface. The desirable unit weight of a suitable coating is around 190 pounds per cubic foot ("pcf"). A coating with a lower unit weight may not provide adequate negative buoyancy, or may require a large volume of concrete, thus making the pipe assembly unwieldy.

In one embodiment, economical heavy concrete weight includes cement and aggregates. The cement can be any cementious compound that has sufficient binding properties for the condition in which it will be used. For example, the cement is capable of binding the economical heavy concrete weight with enough strength to resist failure during placement. The cement can also bind the economical heavy concrete weight to the length of pipe 104. Furthermore, in some embodiments, the cement maintains its binding properties while exposed to sea water or fresh water.

Cement can be, for example, any type of portland cement, as defined by ASTM Specification C-150. In one embodiment, the cement includes calcium compounds, silica, alumina, iron oxide, and gypsum. The cement can be a type that resists sulfate attack, such as, for example, Type V portland cement (as defined by ASTM C150) or any hydraulic cement meeting the requirements of Type HS (as defined by ASTM C1157). In one embodiment, pozzolan, or a blend of pozzolan and portland cement is used as a cementious compound. Pozzolan, when added to portland cement, can increase the strength of the cement and can also increase resistance to sulfate attacks.

The cementious compound can be activated with water and used to bind aggregates and, thus, form economical heavy concrete weight. Typical concrete made with Portland cement and natural aggregates may not meet the 190 pcf criterion for concrete coating suitable to weight pipe segments. Therefore, high density aggregates are added to the concrete to increase the weight of the concrete. One high density aggregate can be iron ore. However, if iron ore is the only high density aggregate, concrete coating may include as much as 75%, by weight, iron ore in order to achieve 190 pcf.

In one embodiment of economical heavy concrete weight coating, the aggregates can include iron ore, sand, and steel slag. In a preferred embodiment of economical heavy concrete weight coating, both steel slag and iron ore are used as aggregates. Other aggregates may also be used. In some embodiments, the economical heavy concrete weight coating includes 40-45% iron ore, 30-35% steel slag, 16-17% cement, 2-3% sand, and 5-6% water at the time it is mixed. The water can be consumed in a chemical reaction when the cement cures.

Steel slag is the slag produced when steel billets are purified in an electric arc furnace or a basic oxygen furnace. Unlike blast furnace slag, steel slag does not have cementious binding properties. Steel slag aggregates can have a generally spherical shape or an irregular shape. Typical steel slag aggregates may range between approximately 2.38 mm and approximately 4.76 mm in diameter or in cross-sectional width. In one embodiment economical heavy concrete weight coating, a substantial portion of the steel slag aggregate includes individual pieces of steel slag, wherein each of the individual pieces have a width of about 2.38 mm to 4.76 mm. Steel slag has a higher density than natural aggregate and, thus, can be used to create concrete having a higher density than concrete having natural aggregate. Furthermore, steel slag can contain iron, giving it a greater density than blast furnace slag. Preferably, steel slag used in ECH has a bulk specific gravity of at least about 3.4. In one embodiment, steel slag for use as economical heavy concrete weight coating can include by weight, about 10-40% iron oxide and preferably 30-35% iron oxide, 5-10% aluminum oxide, 20-25% calcium oxide, and 7-10% magnesium oxide. In another embodiment, steel slag can include about 10-40% iron oxide, 40-52% calcium oxide, and 10-19% silicon oxide. Steel slag is an industrial waste product that is a disposed problem. Economical heavy concrete weight is an environmentally friendly, beneficial use of an industrial waste product that may otherwise end up in a land fill.

Steel slag aggregates, without iron ore, can be used to increase the density of concrete, but the density may be insufficient to function as economical heavy concrete weight coating. As shown in the following table, an embodiment having steel slag as the only high-density aggregate results in a unit weight of 176 pcf, which is less than the desired unit weight of 190 pcf.

| Material | Weight % | Average Unit Weight (pcf) |
| --- | --- | --- |
| Cement | 14.06 | 176 |
| Iron ore | — | |
| Slag aggregate | 79.7 | |
| Sand | 1.4 | |
| Water* | 4.78 | |

*Value reflects amount of water present at the time the concrete coating is mixed.

Due to the lower unit weight associated with concrete coating wherein steel slag is the only high density aggregate, a relatively thick coating is used to provide an amount of negative buoyancy to a length of submarine pipe operable to maintain submersion. Indeed, a concrete coating having only steel slag as an aggregate is significantly thicker than a concrete coating made with iron ore aggregate.

As described, above, a binding agent, such as cement, is used to bind the iron ore, steel slag, sand, and any other components of the economical heavy concrete weight coating. An unexpected benefit, however, is that, in spite of the lack of cementious binding properties in steel slag, the quantity of cement operable to bind economical concrete is less than the quantity of cement operable to bind Portland cement or concrete coating having just iron ore as aggregate. In some embodiments, the quantity of cement used in economical heavy concrete weight coating can be about 15-16%, by weight, rather than the 17.5% cement used for concrete coating having iron-ore aggregate and an absence of steel slag. Another unexpected result of economical heavy concrete weight coating having both steel slag and iron as aggregate is a compressive strength of more than about 50 $N/mm^2$.

Given the same volume, economical heavy concrete weight can be 30 to 40% heavier than standard Portland cement concrete. Indeed, economical heavy concrete weight coating having both steel slag and iron ore as aggregate can have a unit weight greater than about 190 pcf. In an exemplary embodiment, the economical heavy concrete weight coating has a unit weight of about 200 pcf. Part of the density of economical heavy concrete weight is due to the iron content in the steel slag. Indeed, the steel slag has a higher density than blast furnace slag and thus can be used to create higher density concrete. Furthermore, due to the increased iron ore aggregate content, economical heavy concrete weight coating containing both steel slag and iron ore as aggregate achieves higher unit weight than a coating having just steel slag as an aggregate. The economical heavy concrete weight coating can, however, have a unit weight below 210 pcf, as shown in the following tables. The following table shows composition, by weight, of an exemplary embodiment of economical heavy concrete weight coating having steel slag and iron ore as aggregate.

| Material | Weight % | Average Unit Weight (pcf) |
| --- | --- | --- |
| Cement | 15.93 | 207 |
| Iron ore | 55.02 | |
| Slag aggregate | 19.66 | |
| Sand | 3.94 | |
| Water* | 5.42 | |

*Value reflects amount of water present at the time the economical heavy concrete weight coating is mixed.

The following tables illustrate the unit weight of concrete coating having heavy aggregate of iron ore and economical heavy concrete weight coating 102 having aggregates of iron ore and steel slag:

TABLE 1

Unit weight development of concrete coating having only iron ore.

| Sample # | Age, Days | Length, cm | Width, cm | Depth, cm | Weight, gr | Unit Wt., Pcf | Avg. Unit Wt. Pcf |
|---|---|---|---|---|---|---|---|
| 1 | 7 | 10.11 | 10.16 | 10.138 | 3671.3 | 219.8 | 220.77 |
| 2 |   | 10.02 | 10.10 | 10.188 | 3653.9 | 220.94 |   |
| 3 |   | 10.22 | 10.22 | 10.09 | 3745.3 | 221.56 |   |
| 4 | 14 | 10.018 | 10.20 | 10.04 | 3642.7 | 221.37 | 222.08 |
| 5 |   | 10.08 | 10.10 | 10.1 | 3655 | 221.61 |   |
| 6 |   | 10.00 | 10.192 | 10.11 | 3690 | 223.26 |   |
| 7 | 28 | 10.038 | 10.26 | 10.086 | 3653.8 | 219.30 | 220.43 |
| 8 |   | 10.20 | 10.00 | 10.16 | 3669.3 | 220.79 |   |
| 9 |   | 10.11 | 10.01 | 10.266 | 3686.4 | 221.22 |   |

TABLE 2

Unit weight development of concrete coating having only iron ore.

| Sample # | Age, Days | Length, cm | Width, cm | Depth, cm | Weight, gr | Unit Wt., Pcf | Avg. Unit Wt. Pcf |
|---|---|---|---|---|---|---|---|
| 1 | 7 | 10.07 | 10.10 | 10.21 | 3143.5 | 188.73 | 190.93 |
| 2 |   | 10.12 | 10.08 | 9.97 | 3134.7 | 192.16 |   |
| 3 |   | 10.14 | 10.23 | 10.12 | 3231.5 | 191.92 |   |
| 4 | 14 | 10.09 | 10.09 | 10.13 | 3133.4 | 189.42 | 189.24 |
| 5 |   | 10.12 | 10.00 | 10.15 | 3129.3 | 189.93 |   |
| 6 |   | 10.07 | 10.15 | 10.10 | 3120.3 | 188.37 |   |
| 7 | 28 | 10.08 | 10.03 | 10.136 | 3151.3 | 191.72 | 191.10 |
| 8 |   | 10.19 | 9.97 | 10.17 | 3172.3 | 191.46 |   |
| 9 |   | 10.00 | 10.078 | 10.18 | 3128.7 | 190.13 |   |

TABLE 3

Unit weight development of economical heavy concrete weight coating having iron ore and steel slag aggregate.

| Sample # | Age, Days | Length, cm | Width, cm | Depth, cm | Weight, gr | Unit Wt., Pcf | Avg. Unit Wt. Pcf |
|---|---|---|---|---|---|---|---|
| 1 | 7 | 10.17 | 10.04 | 10.07 | 3354 | 203.37 | 203.87 |
| 2 |   | 10.03 | 10.07 | 10.142 | 3360 | 204.58 |   |
| 3 |   | 10.04 | 10.186 | 10.05 | 3356 | 203.65 |   |
| 4 | 14 | 10.17 | 10.16 | 10.24 | 3430 | 202.11 | 202.45 |
| 5 |   | 10.10 | 10.17 | 10.05 | 3362 | 203.04 |   |
| 6 |   | 10.04 | 10.158 | 10.14 | 3354 | 202.20 |   |
| 7 | 28 | 10.024 | 10.214 | 10.264 | 3414.3 | 202.56 | 203.74 |
| 8 |   | 10.00 | 10.1 | 10.138 | 3364.5 | 204.86 |   |
| 9 |   | 10.14 | 10.128 | 10.06 | 3376.1 | 203.81 |   |

TABLE 4

Unit weight development of economical heavy concrete weight coating having iron ore and steel slag aggregate.

| Sample # | Age, Days | Length, cm | Width, cm | Depth, cm | Weight, gr | Unit Wt., Pcf | Avg. Unit Wt. Pcf |
|---|---|---|---|---|---|---|---|
| 1 | 7 | 10.138 | 10.198 | 10.12 | 3446.2 | 205.35 | 204.06 |
| 2 |   | 10.27 | 10.2 | 9.97 | 3418.7 | 204.00 |   |
| 3 |   | 10.24 | 10.12 | 10.096 | 3403.6 | 202.82 |   |
| 4 | 14 | 10.084 | 10.18 | 10.17 | 3395.1 | 202.75 | 202.92 |
| 5 |   | 10.13 | 10.066 | 10.25 | 3397.8 | 202.64 |   |
| 6 |   | 10.20 | 10.05 | 10.2 | 3410.7 | 203.37 |   |
| 7 | 28 | 10.228 | 10.07 | 10.084 | 3409.4 | 204.66 | 204.68 |
| 8 |   | 10.25 | 10.17 | 10.03 | 3428 | 204.41 |   |
| 9 |   | 10.16 | 10.02 | 10.16 | 3399.1 | 204.97 |   |

Subsea pipe 104 is available in a variety of sizes. Economical heavy concrete weight coating can be used as a coating on any size subsea pipe. The outer diameter of the subsea pipe 104 may range from 16-48 inches, or could be larger or smaller. The thickness of the coating may range from about one inch to five inches thick, thus making the outer diameter of the economical heavy concrete weight coating about 17 to 53 inches.

The economical heavy concrete weight coating 102 can be attached to pipes 104 or other subsea equipment (not shown) by various application techniques, including spraying, pouring, or compressing it into place. The economical heavy concrete weight coating can be attached by adhering to the pipe segment, by mechanical fasteners such as bolts, clamps, or rings, or by other suitable techniques. Preferably, connectors such as threads on the ends of pipe segment 104 are not covered with economical heavy concrete weight coating.

Figure 2:
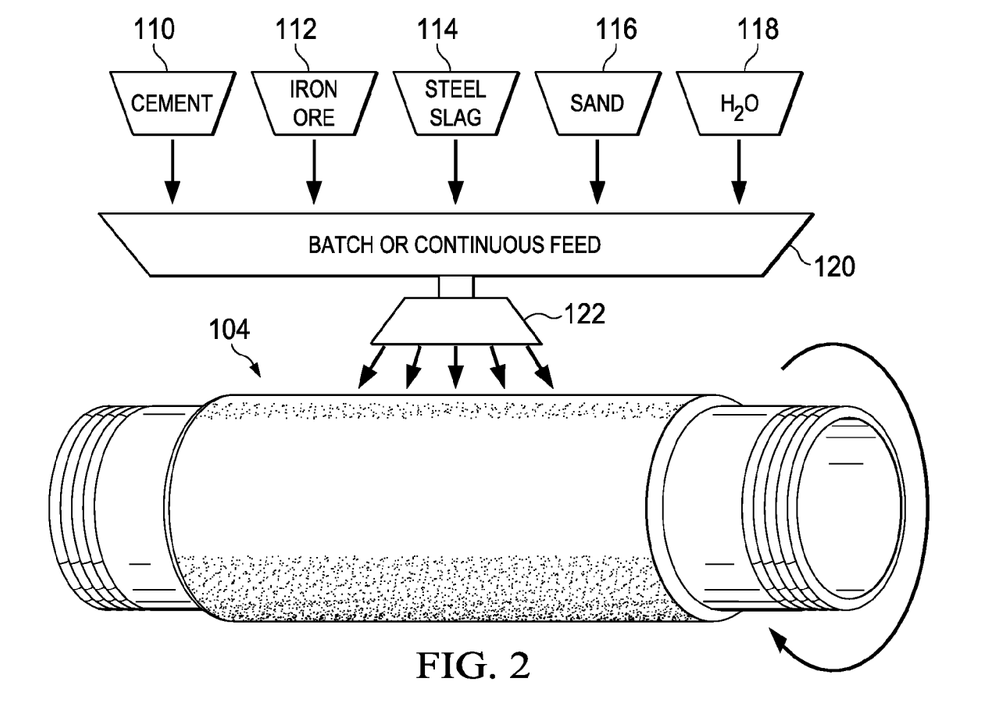
FIG. 2 is a perspective view of an exemplary embodiment of a technique to attach the economical heavy concrete weight coating to the subsea pipe of FIG. 1.

The spraying technique of attaching economical heavy concrete weight coating 102, shown in FIG. 2, involves mixing the cement 110, iron ore 112, steel slag 114, sand 116, and water 118 in a mixing container, such as hopper 120. The economical heavy concrete weight coating 102 can then be sprayed by nozzle 122 onto pipe segment 104 to cover a substantial portion of the exterior surface of the pipe segment. In one embodiment, pipe segment 104 can be rotated and moved axially below a fixed nozzle 122. The cementious properties of the economical heavy concrete weight coating 102 can cause the economical heavy concrete weight 102 to adhere to the pipe segment 104. In another embodiment, pipe segment 104 is rotated while nozzle 122 moves axially. In still another embodiment, pipe segment 104 can remain stationary while nozzle 122 moves axially and circumferentially about pipe segment 104.

Figure 3:
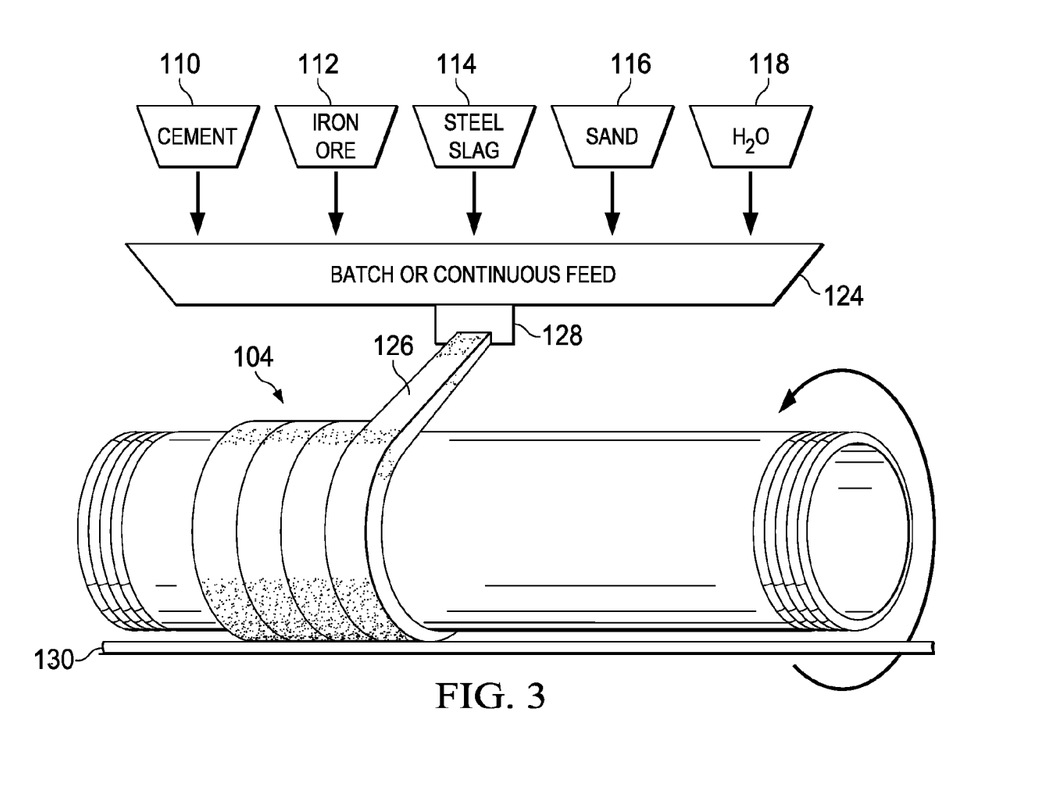
FIG. 3 is a perspective view of another exemplary embodiment of a technique to attach the economical heavy concrete weight coating to the subsea pipe of FIG. 1.

As shown in FIG. 3, in another embodiment, the economical heavy concrete weight coating 102 is attached by being compressed onto pipe segment 104. In this embodiment, cement 110, iron ore 112, steel slag 114, sand 116, and water 118 are mixed in a mixing container such as hopper 124. A still-wet, and thus pliable, economical heavy concrete weight ribbon 126 comes out of nozzle 128 and is compressed onto pipe segment 104. Pipe segment 104 is rotated about its axis as the ribbon 126 is axially advanced along its length. A conveyor 130 can be used to compress ribbon 126 into place on pipe segment 104. Thus, the economical heavy concrete weight coating 102 adheres to the pipe segment 104 as it dries. The pouring technique (not shown) involves building a formwork around the pipe 104 and then pouring the economical heavy concrete weight into the formwork.

Figure 4:
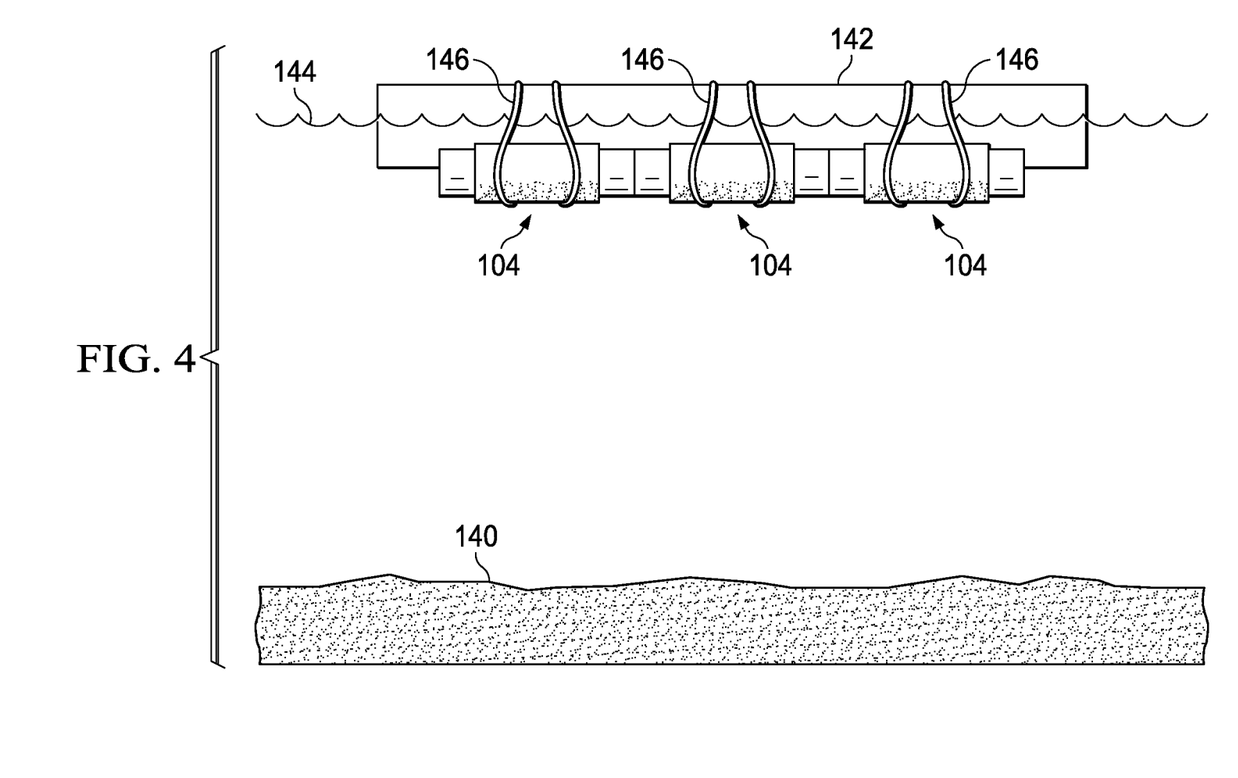
FIG. 4 is a side view of segments of the subsea pipe of FIG. 1 positioned for lowering through a body of water.

The pipe segments 104 having economical heavy concrete weight coating 102 can be used in a variety of ways. For example, they can be used as a subsea pipeline. In one embodiment, they are joined together and placed on the floor of the sea. One technique to place the pipe segments 104 on sea floor 140 involves joining the connectors 108 of adjacent pipe segments 104 to form a length of pipeline. The pipe segments 104 are then suspended by cables 146 from buoyant hangers 142 on the surface 144 of a body of water, as shown in FIG. 4. The cables 146 of a portion of the buoyant hangers 142 can then be lowered at the approximately the same time and rate so that the length of pipeline remains relatively straight as it is lowered toward the sea floor 140. This minimizes strain on connectors 108 and also minimizes flexing of each pipe segment 104. Minimal bending can reduce cracking on the economical heavy concrete weight coating 102.

Figure 5:
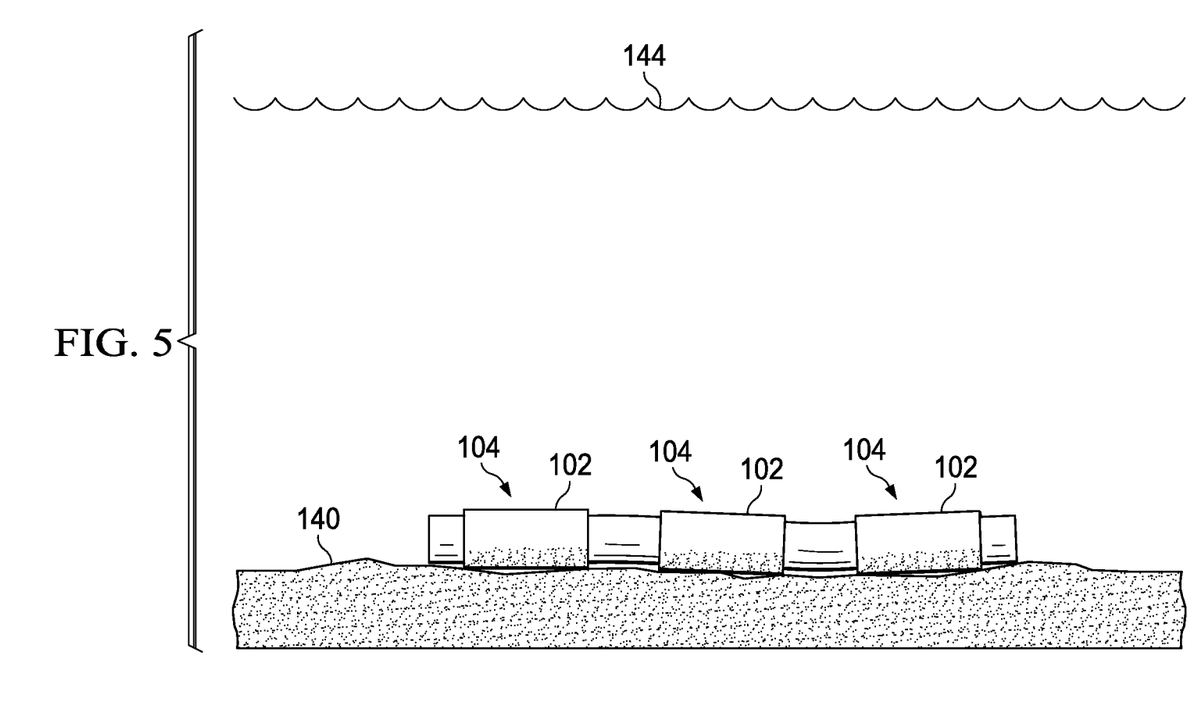
FIG. 5 is a side view of segments of the subsea pipe of FIG. 1 positioned on a sea floor.

As shown in FIG. 5, the pipeline made of pipe segments 104, each having economical heavy concrete weight coating 102, rests on the sea floor 140. The economical heavy concrete weight 102, having a weight of, for example, 200 pounds per cubic foot, prevents the pipe segments 104 from rising off of the sea floor 140. In one embodiment, wherein less negative buoyancy is acceptable, a portion of the pipe segments 104 can be free of economical heavy concrete weight coating 102. For example, every fourth pipe segment 104 can be coating free, while the other three segments have economical heavy concrete weight coating 102. In another embodiment, where less negative buoyancy is required, the coating can be less thick. For example, and embodiment requiring less negative buoyancy may have a one inch thick economical heavy concrete weight coating 102, whereas an embodiment requiring more negative buoyancy may have a five inch thick coating.

What is claimed is:

1. An apparatus for weighting pipes, the apparatus comprising:
   a plurality of pipe segments, each of the plurality of pipe segments having an exterior surface and a first connector at a first end and a second connector at a second end, each of the first and second connectors positioned to connect each of the plurality of pipe segments to an adjacent one of the plurality of pipe segments;
   an economical heavy concrete weight coating attached to the exterior surface, the economical heavy concrete weight coating having a unit weight greater than about 190 pounds per cubic foot, a compressive strength able to withstand 50 Newtons per square millimeter, the economical heavy concrete weight coating comprising:
      a cementious compound comprising calcium compounds, silica, alumina, iron oxide, and gypsum;
      steel slag aggregate comprising 30-35% iron oxide, 5-10% aluminum oxide, 20-25% calcium oxide, and 7-10% magnesium oxide, having a specific gravity greater than 3.2, and water absorption less than 3%;
      iron ore aggregate;
      sand; and
   wherein the economical heavy concrete weight coating extends axially along the exterior surface of each pipe segment and has a radial thickness in a range of 1-5 inches.

2. The apparatus of claim 1, wherein the economical heavy concrete weight coating is attached to the exterior surface by first forming a ribbon of economical heavy concrete weight coating and compressing the ribbon of the economical heavy concrete weight coating onto the length of pipeline as the length of pipeline is rotated about its axis.

3. The apparatus of claim 1, wherein the economical heavy concrete weight coating is attached to the length of pipeline by pouring the economical heavy concrete weight coating into a mold, wherein the length of pipeline is located in the mold.

4. The apparatus of claim 1, wherein the economical heavy concrete weight coating is attached to the length of pipeline by spraying the economical heavy concrete weight coating onto the length of pipeline.

5. The apparatus of claim 1, wherein the iron ore comprises 40-45% of the total weight of the economical heavy concrete weight coating.

6. The apparatus of claim 1, wherein the cementious compound comprises no more than 17% of the total weight of the economical heavy concrete weight coating.

7. The apparatus of claim 1, wherein the cementious compound comprises at least 15% of the total weight of the economical heavy concrete weight coating.

8. The apparatus of claim 1, wherein the economical heavy concrete weight coating comprises, by weight, 30-35% steel slag.

9. The apparatus of claim 1, wherein a substantial portion of the steel slag aggregate comprises individual pieces of steel slag, each of the individual pieces of steel slag having a width of 2.38 mm to 4.76 mm.

10. The apparatus of claim 1, wherein the economical heavy concrete weight coating comprises, by weight, 2-3% sand.

11. The apparatus of claim 1, wherein the economical heavy concrete weight coating comprises, by weight, 5-6% water, at the time the economical heavy concrete weight coating is mixed.

12. An apparatus for weighting subsea pipelines, the apparatus comprising:
   an economical heavy concrete weight coating comprising:
   40 to 45% iron ore;
   16-17% cement;
   2-3% sand; and
   30 to 35% steel slag, the steel slag comprising:
      30-35% iron oxide;
      5-10% aluminum oxide;
      20-25% calcium oxide;
      7-10% magnesium oxide; and
   a segment of pipeline, wherein the economical heavy concrete weight coating covers a substantial portion of an exterior surface of the segment of pipeline.

13. The apparatus according to claim 12, wherein the steel slag does not have cementious binding properties.

14. The apparatus according to claim 12, wherein the radial thickness of the economical heavy concrete weight coating is less then five inches.

15. The apparatus according to claim 12, wherein the unit weight of the economical heavy concrete weight coating is at least 190 pcf.

16. The apparatus according to claim 15 wherein the unit weight of the economical heavy concrete weight coating is less than 210 pcf.

* * * * *